Figure 1:
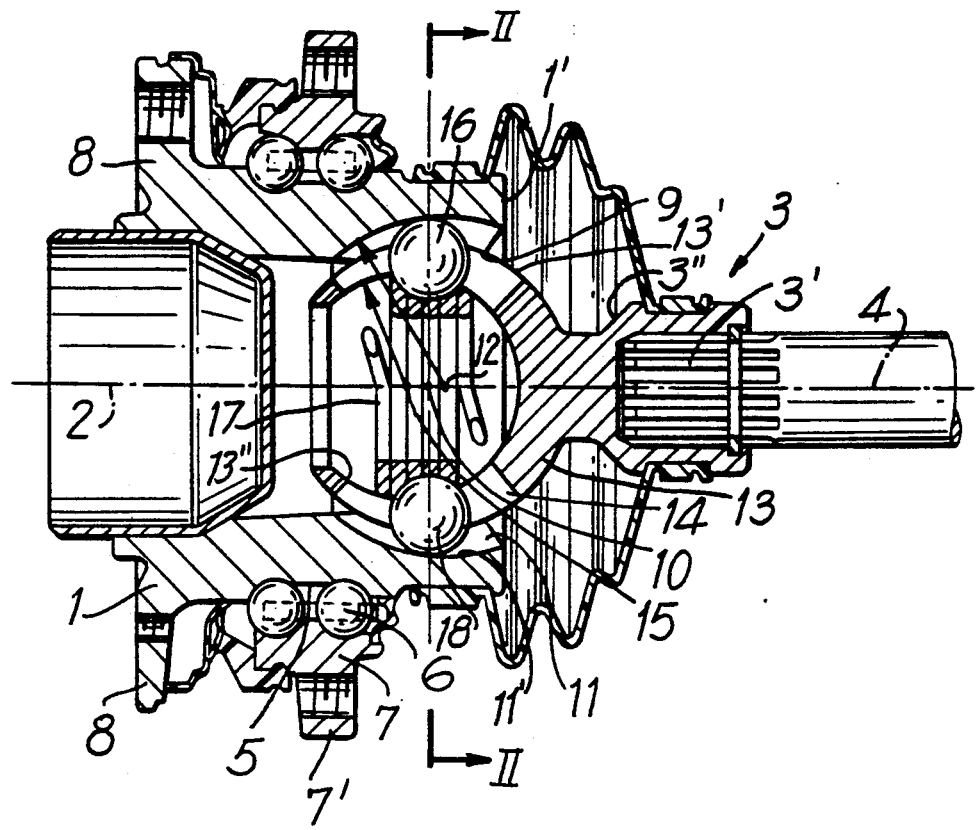

United States Patent [19]
Kapaan et al.

[11] Patent Number: 5,156,571
[45] Date of Patent: * Oct. 20, 1992

[54] HOMOKINETIC COUPLING WITH FLAT SPHERICAL ROLLER ELEMENTS AND RADIAL SPRING FORCE ACTION

[75] Inventors: Hendrikus J. Kapaan, Nieuwegein; Stanislaw Kruk, Västra Frölunda; Paul Richardson, Vianen; Wilhelm L. F. van Wijk, Nieuwegein, all of Netherlands

[73] Assignee: SKF Industrial Trading & Development Co., B.V., Nieuwegein, Netherlands

[*] Notice: The portion of the term of this patent subsequent to Feb. 26, 2008 has been disclaimed.

[21] Appl. No.: 668,603

[22] Filed: Mar. 13, 1991

[30] Foreign Application Priority Data

Mar. 13, 1990 [NL] Netherlands ............... 9000576

[51] Int. Cl.⁵ ............................................. F16D 3/22
[52] U.S. Cl. ........................................ 464/143; 464/906
[58] Field of Search .............. 464/139, 141, 142, 143, 464/152, 906, 136

[56] References Cited

U.S. PATENT DOCUMENTS

| | | | |
|---|---|---|---|
| 1,677,311 | 4/1928 | Weiss | 464/142 |
| 2,238,647 | 4/1941 | Ivandick | 464/906 X |
| 2,286,498 | 6/1942 | Miller | 464/142 |
| 2,839,905 | 6/1958 | Trbojevich | 464/142 |
| 3,789,624 | 2/1974 | Camosso | 464/906 X |
| 3,919,861 | 11/1975 | Bellomo | 464/906 X |
| 4,156,354 | 5/1979 | Krude | 464/141 |
| 4,249,395 | 2/1981 | Krude et al. | 464/143 |
| 4,432,741 | 2/1984 | Winkler | 464/906 X |
| 4,449,956 | 5/1984 | Ueno | 464/142 X |
| 4,493,676 | 1/1985 | Krude | 464/141 |
| 4,541,819 | 9/1985 | Mazziotti | 464/146 X |
| 4,995,850 | 2/1991 | van der Drift et al. | 464/143 |

FOREIGN PATENT DOCUMENTS 1500768  2/1978  United Kingdom.

Primary Examiner—Daniel P. Stodola
Assistant Examiner—Tony A. Gayoso
Attorney, Agent, or Firm—Rosen, Dainow & Jacobs

[57] ABSTRACT

A homokinetic coupling wherein the torque transmitting elements include spherical elements flattened at two mutually opposed points, the flattened elements being in contact with the side walls of open slots within the wall of the hollow spherical element of the inner coupling member.

1 Claim, 1 Drawing Sheet

HOMOKINETIC COUPLING WITH FLAT SPHERICAL ROLLER ELEMENTS AND RADIAL SPRING FORCE ACTION

The invention relates to a homokinetic coupling for coupling two parts together, in particular a shaft capable of being driven in rotation and a member to be driven in rotation, in such manner that said parts can be deflected from the position in which their centerlines coincide into positions in which said centerlines make an angle with each other, comprising an outer coupling member in the form of a housing capable of being connected to one of the parts so that the centerline of the housing coincides with that of said part and having a cavity at one end open to the outside, bounded by a portion of a first spherical surface, the center of the sphere coinciding with the point where the aforesaid centerlines intersect, and an inner coupling member comprising a generally hollow spherical element located concentrically within the cavity, the cavity of the said hollow element being bounded by a portion of a second spherical surface with center located on the prolongation of the centerline of the inner coupling member at a distance from the center of the first spherical surface, which element can be connected to the other part so that their centerlines coincide, a plurality of grooves running in the direction of the centerline of the housing being formed in the wall of the cavity of the outer coupling member, the bottoms of which grooves each extend along a circular arc, the common center of the circular arcs being located on the prolongation of the centerline of the housing at a distance from the said center of the first spherical surface, and in the wall of the hollow spherical element of the inner coupling member, a like number of open slots running in the direction of the centerline thereof, and a like number of essentially spherical torque-transmitting elements are present, each accommodated on the one hand in a groove in the wall of the cavity in the outer coupling member, and projecting inward through an open slot in the inner coupling member, a guiding member being arranged in the cavity of the inner coupling member, comprising a generally disk-like element having a groove along its periphery in which the inward-projecting portions of the torque-transmitting elements are accommodated, which disk-like element is so fashioned that a spring action directed radially outward is exerted thereby on the said torque-transmitting elements, so that the centers of these elements lie in a plane perpendicular to the plane of the centerlines.

Such a homokinetic coupling is known from U.S. Pat. No. 4,995,850 (Neteherlands Patent Application 8,801,394).

In the known coupling, the torque-transmitting elements comprise plain spherical elements or balls, so that these elements are in contact with the walls of the slots in the inner coupling member along a spherical surface when in operation, high contact stresses being generated when a torque is transmitted by way of these elements.

The object of the invention is to provide an improved coupling of the above mentioned type.

This object is accomplished in that, in the homokinetic coupling according to the invention, the torque-transmitting elements comprise spherical elements that are flattened off at two mutually opposed points, these elements being in contact with the side walls of the open slots in the wall of the hollow spherical element of the inner coupling member at their flattened portions.

In a homokinetic coupling of this construction, the said contact stresses are much diminished. Furthermore, in assembling the coupling, such flattened balls can be more conveniently placed in the grooves formed in the wall of the cavity of the outer coupling member, because the flats provide effective guidance. Besides, tilting moments are readily taken up.

It is noted that British Patent 1,500,768 discloses a homokinetic clutch in which the torque-transmitting elements comprise flatted balls. In this known coupling, however, the balls are so held together by a cage that the centers of the balls are kept in a plane perpendicular to the plane of the centerlines. Thus each ball is so accommodated in an opening in the cage that the flats of the ball are in contact with the side walls of the opening.

Figure 2:
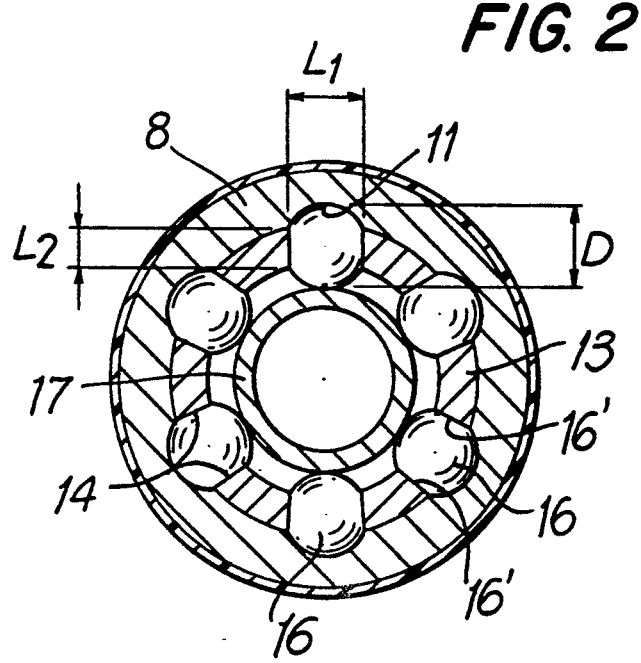

The invention will be further illustrated with reference to the drawing, in which FIG. 1 shows a longitudinal section of an embodiment of the coupling according to the invention, and FIG. 2 shows a cross section at the line II—II in FIG. 1.

As shown in FIG. 1, the coupling comprises an outer portion in the form of a housing 1 with centerline 2 and an inner portion 3 with centerline 4. A peripheral portion 5 of the housing is made to form an inner race for a rolling bearing with rolling elements 6 and an outer race 7 provided with a flange 7' whereby the coupling can be mounted for example on the chassis of a motor vehicle with front-wheel drive. The housing 2 is further provided with a hub 8 by which the wheel can be mounted on the housing.

In the housing 1, a cavity is formed, open to the outside and bounded by a portion of a spherical surface 9 whose center is located at 10. In the wall of this cavity, a plurality of grooves 11, for example six, are arranged, whose bottoms 11' run along circular arcs having a common center 12.

The inner portion 3 comprises a hollow spherical member 13 whose outer surface 13', in the form of a spherical surface, has the point 10 as center, while the inner surface 13" likewise has the form of a spherical surface, with center at 15. In the wall of this spherical member 13, a like plurality of open slots 14 are arranged, hence again six for example. Further, the part 3 has a cavity 3' provided with splines for the fixation of a drive shaft therein.

A plurality of spherical elements 16 corresponding to the number of grooves 11 and of slots 14 are so arranged that each element 16 is accommodated partly in a groove 11 and partly in a corresponding slot 14, the element 16 protruding inward through the slot 14. Inside the hollow spherical part 13', a generally disk-like guiding member 17 having a groove 17' running along its periphery is arranged, in the form of a strip of spring steel coiled to make a tension spring, so that the portions of the elements 16 protruding through the slots 14 will be accommodated in the groove 17', while the said spring exerts a pressure directed radially outward on the elements 16, and at the same time the said member 17 holds the elements 16 together in such a way that the centers of the elements are kept in a plane perpendicular to the plane 18 containing the centerlines 2 and 4.

As may be seen particularly in FIG. 2, the torque-transmitting elements 16 comprise spherical elements having flats 16' at two mutually opposed points, said elements 16 being in contact with the side walls of the open slots 14 in the wall of the hollow spherical element 13 of the inner coupling member 3 at their flats 16'.

It may also be noted in FIG. 2 that the dimensions of each element 16 as indicated therein have the following proportions:

$$D:L_1:L_2 = 1:k:\sqrt{1-k^2}, \text{ where k has a given value.}$$

We claim:

1. In a Homokinetic coupling for coupling two parts together, in particular a shaft capable of being driven in rotation and a member to be driven in rotation thereby, in such manner that said parts may be deflected from the position in which their centerlines lie in each other's prolongations into positions in which said centerlines make an angle with each other, the coupling including an outer coupling member in the form of a housing connectable to one of the parts and having a cavity open to the outside at one end, bounded by a portion of a first spherical surface, the center of the sphere coinciding with the point where the said centerlines intersect, and an inner coupling member comprising a generally hollow spherical element placed concentrically within the cavity, its own cavity being bounded by a portion of a second spherical surface with center located on the prolongation of the centerline of the inner coupling member at a distance from the center of the first spherical surface, which element is connectable to the other part so that their centerlines coincide, a plurality of grooves extending in the direction of the centerline of the housing being formed in the wall of the cavity of the outer coupling member, their bottoms each running along a circular arc, the common center of the arcs being located on the prolongation of the centerline of the housing at a distance from the said center of the first spherical surface, and in the wall of the hollow spherical element of the inner coupling member, a like plurality of open slots extending in the direction of the centerline thereof, a like plurality of essentially spherical torque-transmitting elements being present, each partly accommodated in a groove in the wall of the cavity of the outer coupling member and protruding inward through an open slot in the inner coupling member, a guiding element being arrange in the cavity of the inner coupling member, the guiding element including a generally disk-like member having a groove along its periphery wherein the inward-protruding portions of the torque-transmitting elements are accommodated, which disk-like member is so fashioned that a spring action directed radially outward is exerted thereby on the said torque-transmitting elements, so that the centers of said elements will lie in a plane perpendicular to the plane of the centerlines, the improvement wherein said torque-transmitting elements comprise a plurality of spherical elements flattened at two opposing points, the flats of said elements being in contact with the side walls of the open slots in the wall of the hollow spherical element of the inner coupling member.

* * * * *